(12) United States Patent
Bill

(10) Patent No.: US 12,296,628 B2
(45) Date of Patent: May 13, 2025

(54) WHEEL ASSEMBLY SENSOR APPARATUS

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 41 days.

(21) Appl. No.: 18/257,823

(22) PCT Filed: Dec. 16, 2021

(86) PCT No.: PCT/EP2021/086080
§ 371 (c)(1),
(2) Date: Jun. 15, 2023

(87) PCT Pub. No.: WO2022/129275
PCT Pub. Date: Jun. 23, 2022

(65) Prior Publication Data
US 2024/0051356 A1  Feb. 15, 2024

(30) Foreign Application Priority Data
Dec. 16, 2020  (GB) .................................. 2019868

(51) Int. Cl.
*B60C 23/06*  (2006.01)
*B60C 23/04*  (2006.01)

(52) U.S. Cl.
CPC ........ *B60C 23/066* (2013.01); *B60C 23/0498* (2013.01); *B60C 2200/02* (2013.01)

(58) Field of Classification Search
CPC .............. B60C 23/066; B60C 23/0498; B60C 2200/02
See application file for complete search history.

(56) References Cited

U.S. PATENT DOCUMENTS 7,775,096 B2 *  8/2010  Ivory .................... G01M 17/02
                                              73/146
8,742,912 B2     6/2014  Blanchard
9,776,462 B1    10/2017  Gray
(Continued)

FOREIGN PATENT DOCUMENTS

CN    106364263    2/2017
CN    107116968    9/2017
(Continued)

OTHER PUBLICATIONS

International Search Report and Written Opinion cited in PCT/EP2021/085845, mailed Apr. 20, 2022, 13 pages.
(Continued)

*Primary Examiner* — Mohamed Barakat
(74) *Attorney, Agent, or Firm* — Nixon & Vanderhye P.C.

(57) ABSTRACT

A sensor apparatus for measuring a property of a wheel assembly is disclosed including at least one sensor configured to acquire measurement data; and a mounting member attached to the at least one sensor. The mounting member is configured to engage with a wheel such as to retain the sensor on the wheel within an enclosed space formed by the wheel and a tire mounted on the wheel. The mounting member is further configured to enable the sensor to move around the circumference of the wheel when the mounting member is engaged with the wheel.

21 Claims, 5 Drawing Sheets

(56) References Cited

U.S. PATENT DOCUMENTS

| | | | |
|---|---|---|---|
| 10,035,387 B2 | 7/2018 | Carresjö et al. | |
| 11,110,758 B1* | 9/2021 | Dages | B60C 23/0483 |
| 2002/0148286 A1 | 10/2002 | Losey | |
| 2003/0154007 A1 | 8/2003 | Evans et al. | |
| 2004/0154388 A1 | 8/2004 | Wilson et al. | |
| 2004/0182146 A1 | 9/2004 | Wilson | |
| 2005/0251306 A1 | 11/2005 | Gowan et al. | |
| 2008/0144985 A1 | 6/2008 | Joki et al. | |
| 2009/0038414 A1* | 2/2009 | Ozaki | B60B 27/0005 73/862.381 |
| 2013/0312509 A1 | 11/2013 | Solomon et al. | |
| 2013/0342341 A1 | 12/2013 | Simmerman et al. | |
| 2014/0150542 A1 | 6/2014 | Townsend et al. | |
| 2015/0153250 A1* | 6/2015 | Yeom | B60C 23/066 73/146 |
| 2016/0334209 A1* | 11/2016 | Linson | G01B 5/255 |
| 2019/0329809 A1* | 10/2019 | MacKay | B60K 17/043 |
| 2020/0122529 A1 | 4/2020 | Skjermo et al. | |
| 2020/0290411 A1* | 9/2020 | Bickard | B60C 23/0488 |

FOREIGN PATENT DOCUMENTS

| | | | | |
|---|---|---|---|---|
| CN | 107160951 | | 9/2017 | |
| CN | 110920632 | | 3/2020 | |
| CN | 110920632 A | * | 3/2020 | B60C 23/04 |
| DE | 10 2007 010 782 | | 2/2008 | |
| DE | 10 2008 060 542 | | 6/2010 | |
| DE | 10 2010 016 378 | | 10/2011 | |
| DE | 10 2010 037 597 | | 3/2012 | |
| EP | 3 118 030 | | 1/2017 | |
| EP | 3 862 197 | | 8/2021 | |
| GB | 2461928 | | 1/2010 | |
| JP | 5967307 | | 5/1984 | |
| JP | 2004-284396 | | 10/2004 | |
| JP | 4198817 | | 12/2008 | |
| JP | 4735079 | | 7/2011 | |
| KR | 20080035073 | | 4/2008 | |
| WO | 01/54955 | | 8/2001 | |

OTHER PUBLICATIONS

Combined Search and Examination Report cited in GB2019750.5 mailed May 20, 2021, 7 pages.
International Search Report and Written Opinion cited in PCT/EP2021/085847, mailed May 2, 2022, 12 pages.
Combined Search and Examination Report cited in GB2019753.9 mailed May 20, 2021, 7 pages.
International Search Report and Written Opinion cited in PCT/EP2021/085849, mailed May 2, 2022, 14 pages.
International Search Report and Written Opinion cited in PCT/EP2021/086080, mailed Apr. 20, 2022, 15 pages.
Combined Search and Examination Report cited in GB2019868.5 mailed May 11, 2021, 7 pages.
International Search Report and Written Opinion cited in PCT/EP2021/086082, mailed May 2, 2022, 15 pages.
Combined Search and Examination Report cited in GB2019869.3 mailed May 17, 2021, 8 pages.
Office Action for U.S. Appl. No. 18/257,771, 19 pages, dated Oct. 16, 2024.

* cited by examiner

WHEEL ASSEMBLY SENSOR APPARATUS

CROSS REFERENCE TO RELATED APPLICATIONS

The present application is a National Phase of International Application Number PCT/EP2021/086080 filed Dec. 16, 2021, which designated the U.S. and claims priority benefits from Great Britain Applications GB 2019868.5, filed Dec. 16, 2020, the entire contents of each of which are hereby incorporated by reference.

TECHNICAL FIELD

The present invention relates to a sensor apparatus for measuring a property of a wheel assembly, to a wheel assembly comprising such a sensor apparatus, to an aircraft comprising such a wheel assembly, and to a method of measuring a property of a wheel assembly.

BACKGROUND

Monitoring properties of vehicle wheel assemblies, such as tire inflation, tread depth, and tire damage is an important part of vehicle maintenance. This is particularly true for aircraft, since the wheel assemblies of an aircraft routinely experience large loads and harsh operating conditions. Currently, many such checks of aircraft wheel assembly properties are performed manually. Automated systems exist for monitoring tire pressure, but these systems require a pressure sensor to be permanently installed on a wheel in a manner specific to the particular design of the wheel. For instance, the wheel must typically include a port to accommodate the sensor, and possibly also a counterweight feature.

The invention set out below seeks to provide an improved sensor apparatus for measuring at least one property of a wheel assembly.

SUMMARY

A first aspect of the present invention provides a sensor apparatus for measuring a property of a wheel assembly comprising a tire mounted on a wheel. The sensor apparatus comprises at least one sensor configured to acquire measurement data; and a mounting member attached to the at least one sensor. The mounting member is configured to engage with a wheel such as to retain the sensor on the wheel within an enclosed space formed by the wheel and a tire mounted on the wheel. The mounting member is further configured to enable the sensor to move around the circumference of the wheel when the mounting member is engaged with the wheel.

Optionally, the mounting member is configured to enable the sensor to continuously travel around the circumference of the wheel in a given direction whilst the wheel remains stationary, when the mounting member is engaged with the wheel.

Optionally, the mounting member is configured to substantially prevent radial and axial movement of the sensor relative to the wheel when the mounting member is engaged with the wheel.

Optionally, the mounting member is configured such that when the mounting member is engaged with the wheel in a deployed operational orientation of the wheel in which the wheel has a lower part relatively near to a surface on which the wheel assembly is resting and an upper part relatively far from the surface, during rotation of the wheel at a taxiing speed, the mounting member enables the sensor to be continuously disposed on the lower part of the wheel. Optionally, during the rotation of the wheel at a taxiing speed the mounting member enables the sensor to be continuously disposed substantially at a lowest part of the wheel.

Optionally, the mounting member comprises a movable mounting band configured to be movably attached to a circumferential surface of the wheel such that relative circumferential movement between the movable mounting band and the wheel is permitted, and the sensor is fixedly attached to the movable mounting band.

Optionally, the sensor is fixedly attached to the movable mounting band at a first circumferential location, and at least one further component is fixedly attached to the movable mounting band at a second, different circumferential location. Optionally, the at least one further component comprises any one or more of: a damper; a battery; a communications device; a counterweight.

Optionally, the movable mounting band comprises one or more contact surfaces configured to contact the circumferential surface of the wheel, and the or each contact surface comprises a low-friction material to facilitate sliding between the or each contact surface and the circumferential surface of the wheel.

Optionally, the movable mounting band is a closed loop configured to encircle the circumferential surface of the wheel.

Optionally, the movable mounting band is an inwardly-tensioned C-shaped spring member.

Optionally, the mounting member comprises a fixed mounting band configured to be fixedly attached to a circumferential surface of the wheel, and the sensor is movably attached to the fixed mounting band such that the sensor is able to move around the circumference of the fixed mounting band.

Optionally, the fixed mounting band comprises at least one circumferential rail which extends completely around the circumference of the fixed mounting band, and the sensor is movably mounted on the at least one circumferential rail.

Optionally, the sensor is configured to emit radiation in a radial direction of a wheel with which the mounting member is engaged, and to detect a reflection of the emitted radiation.

Optionally, the sensor apparatus is configured to determine whether there is relative movement between the sensor and a wheel with which the mounting member is engaged, and the sensor is configured to operate in a first mode if there is relative movement between the sensor and the wheel, and in a second, different mode if there is substantially no relative movement between the sensor and the wheel.

A second aspect of the invention provides a wheel assembly comprising a wheel having an outer circumferential surface configured to face an inner circumferential surface of a tire mounted on the wheel; and a sensor apparatus according to the first aspect mounted on the outer circumferential surface of the wheel.

Optionally, the wheel assembly is an aircraft wheel assembly.

A third aspect of the invention provides an aircraft comprising a wheel assembly according to the second aspect; and a tire mounted on the wheel assembly such that the sensor is disposed within an enclosed space defined by the tire and the wheel.

A fourth aspect of the invention provides a method of measuring a property of a wheel assembly comprising a tire mounted on a wheel. The method comprises:

providing a sensor inside an enclosed space defined by the tire and the wheel;

performing a first measurement when the sensor is disposed at a first circumferential location relative to the wheel; and performing a second measurement when the sensor is disposed at a second, different circumferential location relative to the wheel.

Optionally, the wheel is rotated about its axis between performing the first measurement and performing the second measurement.

Optionally, the method comprises performing a series of measurements, the series including the first measurement and the second measurement, and each measurement of the series is performed when the sensor is at a different circumferential location relative to the wheel, the different circumferential locations being distributed around the circumference of the wheel.

Optionally the wheel assembly is a wheel assembly according to the second aspect.

BRIEF DESCRIPTION OF THE DRAWINGS

Embodiments of the invention will now be described, by way of example only, with reference to the accompanying drawings, in which.

DETAILED DESCRIPTION

Figure 1:
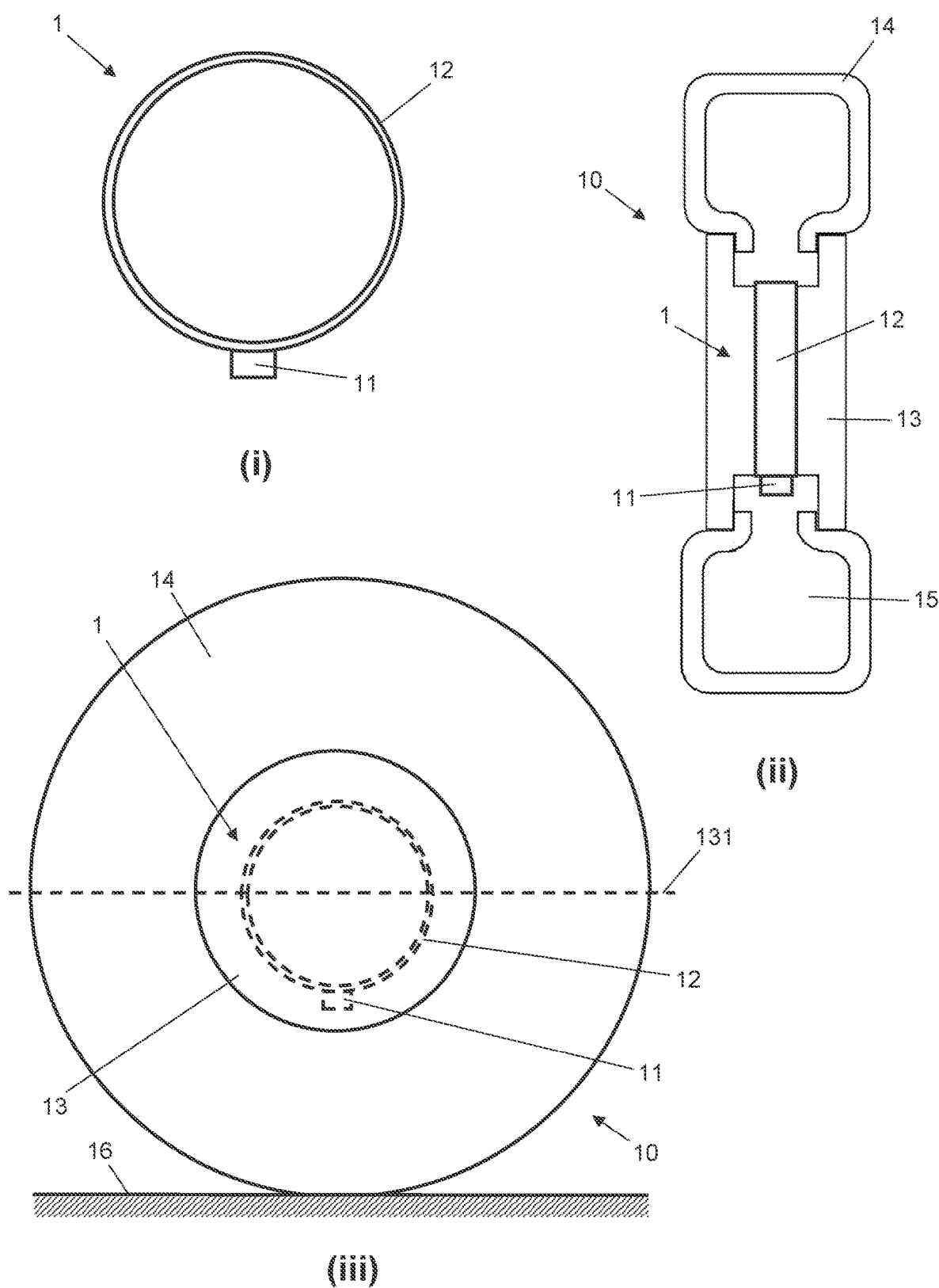
FIG. 1 is a set of schematic views of an example sensor apparatus according to the invention, in isolation and installed on a wheel assembly.

The following description provides several examples of sensor apparatus according to the invention. Each example sensor apparatus is suitable for measuring a property of a wheel assembly comprising a tire mounted on a wheel. Each example sensor apparatus comprises at least one sensor configured to acquire measurement data, and a mounting member attached to the at least one sensor. The mounting member is configured to engage with a wheel such as to retain the sensor on the wheel within an enclosed space formed by the wheel and a tire mounted on the wheel. The mounting member is further configured to enable the sensor to move around the circumference of the wheel when the mounting member is engaged with the wheel.

Example sensor apparatus according to the invention provide several advantages. Being configured to be mounted on a wheel assembly inside an enclosed space formed by the wheel and a tire on the wheel means that the sensor of the sensor apparatus has direct access to the gas in the tire, enabling accurate measurements of properties such as tire pressure and tire gas temperature. Furthermore, the sensor apparatus is protected from the external environment of the wheel assembly and may therefore need to be less robust than a sensor apparatus mounted externally on a wheel assembly.

The relative circumferential movement between the sensor and wheel which is enabled by the configuration of the mounting member advantageously permits the sensor to acquire measurement data covering the full circumference of the wheel assembly. When the sensor apparatus is used on a wheel assembly which is operating to support a vehicle, at least at certain rotational speeds of the wheel assembly, the enabling of relative circumferential movement between the sensor and wheel means that the sensor remains continually located on a lower part of the wheel (due to the influence of gravity on the sensor), which ensures that the balance of the wheel is not affected by the weight of the sensor. The manner in which these advantages are provided by the example sensor apparatus according to the invention will be explained further in the following description.

In examples described herein, references to "aircraft" include all kinds of aircraft, such as fixed wing military or commercial aircraft; unmanned aerial vehicles (UAVs); and rotary wing aircraft, such as helicopters.

It should be noted that the components shown in the drawings are not necessarily shown to scale.

FIG. 1 shows a first example sensor apparatus 1 according to the invention, in isolation (part (i)) and installed on a wheel assembly (parts (ii) and (iii)). The sensor apparatus 1 comprises a sensor 11 and a mounting member 12. Part (i) shows a side view of the sensor apparatus 1. The mounting member 12 is attached to the sensor 11. The attachment between the sensor 11 and the mounting member 12 can be effected in various different ways, as will be further explained below. The mounting member 12 may be movably attached to the sensor 11 such that relative movement is permitted therebetween. Alternatively the mounting member 12 may be fixedly attached to the sensor 11 such that relative movement therebetween is substantially prevented.

The sensor 11 is configured to acquire measurement data. The sensor 11 may be configured to acquire a single type of measurement data, or multiple types of measurement data. In some examples the sensor 11 comprises a set of multiple sensors, each of which may be configured to independently acquire measurement data. Each sensor in the set may acquire a different type of measurement data, or two or more sensors in the set may acquire the same type of measurement data. The sensor 11 may be configured to acquire any or all of the following types of measurement data: tire gas temperature; tire pressure; distance between the sensor and a part of the wheel assembly; distance between the sensor and a surface on which the wheel assembly is supported; acceleration; acoustic noise data; vibration data. The sensor 11 may be configured to use any suitable known sensing technology to acquire the measurement data, depending on which type(s) of measurement data the sensor 11 is intended to acquire.

The sensor 11 may be disposed within a sensor package, which contains one or more further components that are operationally related to the sensor 11. Such further components may include any or all of: a power source (such as a battery or an energy harvesting device) configured to provide power to the sensor 11 and any further powered components comprised in the sensor package; a communications device configured to transmit signals from one or more components of the sensor package to an external device and/or receive signals from an external device; a sensor controller configured to control the operation of the sensor 11 and/or any further component of the sensor package. The sensor 11 is described in more detail below with reference to FIG. 6.

The mounting member 12 is configured to engage with a wheel 13 of a wheel assembly 10 in a manner such as to retain the sensor 11 on the wheel 13. In particular, the mounting member 12 is configured to retain the sensor 11 on the wheel within an enclosed space 15 formed by the wheel 13 and a tire 14 mounted on the wheel, as shown in parts (ii) and (iii) of FIG. 1. Part (ii) is a cross section through the wheel assembly 10, with the example sensor apparatus 1 mounted on the wheel 13. Part (iii) is a side view of the wheel assembly 10 with the example sensor apparatus 1 mounted on the wheel 13. In the illustrated example, the mounting member 12 is a mounting band configured to encircle an outer circumferential surface of the wheel 13 which faces an inner circumferential surface of the tire 14. The diameter of the mounting band is substantially equal to the diameter of the outer circumferential surface of the wheel 13.

The wheel assembly 10 is a wheel assembly for a vehicle. In some examples the wheel assembly 10 is an aircraft wheel assembly. In such examples the wheel 13 comprises an inboard wheel rim and an outboard wheel rim. The inboard wheel rim may house a brake assembly (not shown) for the wheel assembly 10. The outboard wheel rim includes a valve (also not shown) for inflating the tire 14. To construct such an aircraft wheel assembly, the inboard and outboard wheel rims are bolted together with the tire 14 in-between. The tire 14 is then pressurised via the valve, usually with nitrogen. The sensor apparatus 1 may be mounted on such an aircraft wheel assembly before the inboard and outboard wheel rims are bolted together, for example by axially sliding the mounting member onto the hub part of one of the wheel rims. The inboard and outboard wheel rims are then bolted together once the mounting member is in place on the hub part.

The mounting member 12 is configured to substantially prevent radial and axial movement of the sensor 11 relative to the wheel 13 when the mounting member 12 is engaged with the wheel 13. The mounting member 12 is configured to enable the sensor 11 to move around the circumference of the wheel 13 when the mounting member 12 is engaged with the wheel 13. In particular, the sensor 11 is able to continuously travel around the circumference of the wheel in a given direction whilst the wheel 13 remains stationary. This means that the sensor 11 is able to remain substantially stationary (ignoring any translational motion of the wheel assembly 10 that may be occurring) when the wheel 13 is rotating relatively slowly (a relatively show rotation rate of the wheel 13 may occur, for example, during taxiing of an aircraft on which the wheel assembly 10 is installed). At relatively high rotation rates (as may occur, for example, during take-off and landing of an aircraft on which the wheel assembly 10 is installed) the centrifugal force felt by the sensor 11 will cause it to rotate together with the wheel 13.

In a deployed operational orientation of the wheel assembly 10 the wheel 13 has a lower part relatively near to the ground and an upper part relatively far from the ground. The wheel assembly 10 has the deployed operational orientation whenever it is operating to support a vehicle on the ground. Where the vehicle is an aircraft, other operational orientations of the wheel assembly are possible (for example when the wheel assembly is stowed within a landing gear bay during flight of the aircraft).

Part (iii) of FIG. 1 shows the wheel assembly 10 in a deployed operational orientation, resting on a surface 16. In the deployed operational orientation the wheel 13 has a lower part which is relatively near to the surface 16, and an upper part which is relatively far from the surface 16. The lower part is below a mid-line 131 of the wheel 13 and the upper part is above the mid-line 131. During rotation of the wheel 13 at a relatively low speed (e.g. a taxiing speed of an aircraft) the mounting member 12 enables the sensor 11 to be continuously disposed on the lower part of the wheel 13. In some examples the mounting member 12 enables the sensor 11 to be continuously disposed substantially at a lowest part of the wheel 13 (that is, the part of the wheel closest to the surface 16) during rotation of the wheel at a relatively low speed. In the illustrated example the sensor 11 is mounted on a hub part of the wheel 13, meaning that flange parts of the wheel 13 are closer to the surface 16 when the sensor 11 is disposed at the "lowest" part of the wheel 13. However, the term "lowest part of the wheel" should be understood relative to the possible positions of the sensor 11, given that the sensor 11 is prevented from moving radially relative to the wheel 13 by the mounting member 12.

Figure 3:
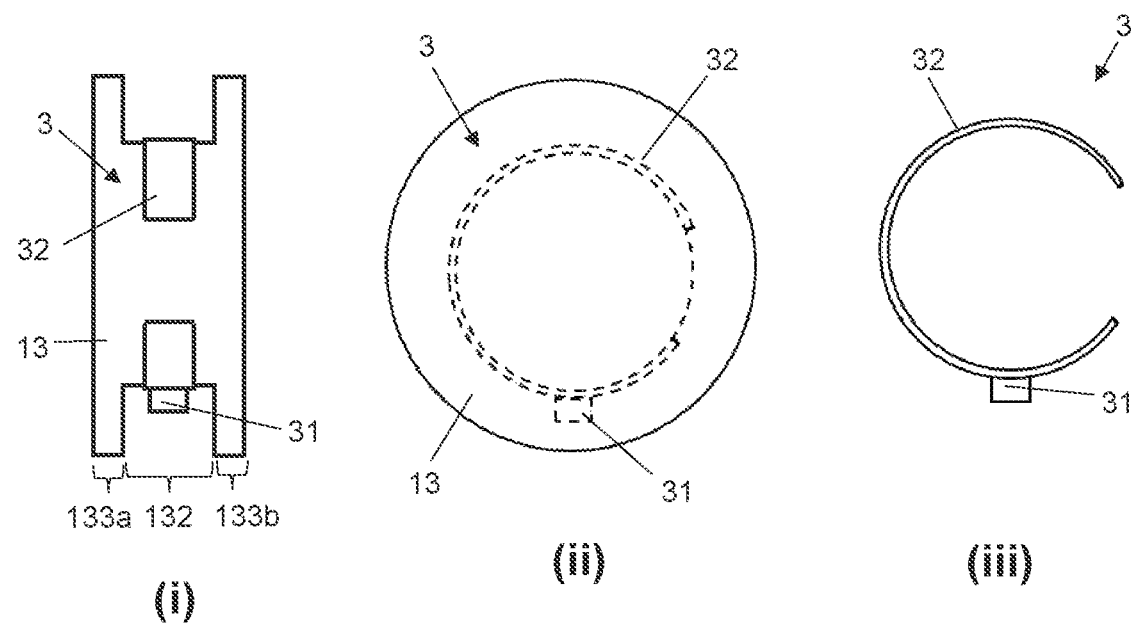
FIG. 3 is a set of schematic views of a further example sensor apparatus according to the invention, in isolation and installed on a wheel.
Figure 4:
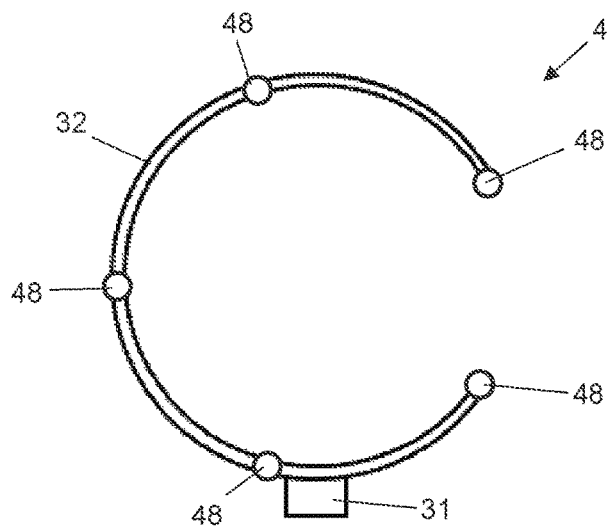
FIG. 4 is a schematic side view of an alternative embodiment of the example sensor apparatus of FIG. 3.
Figure 5:
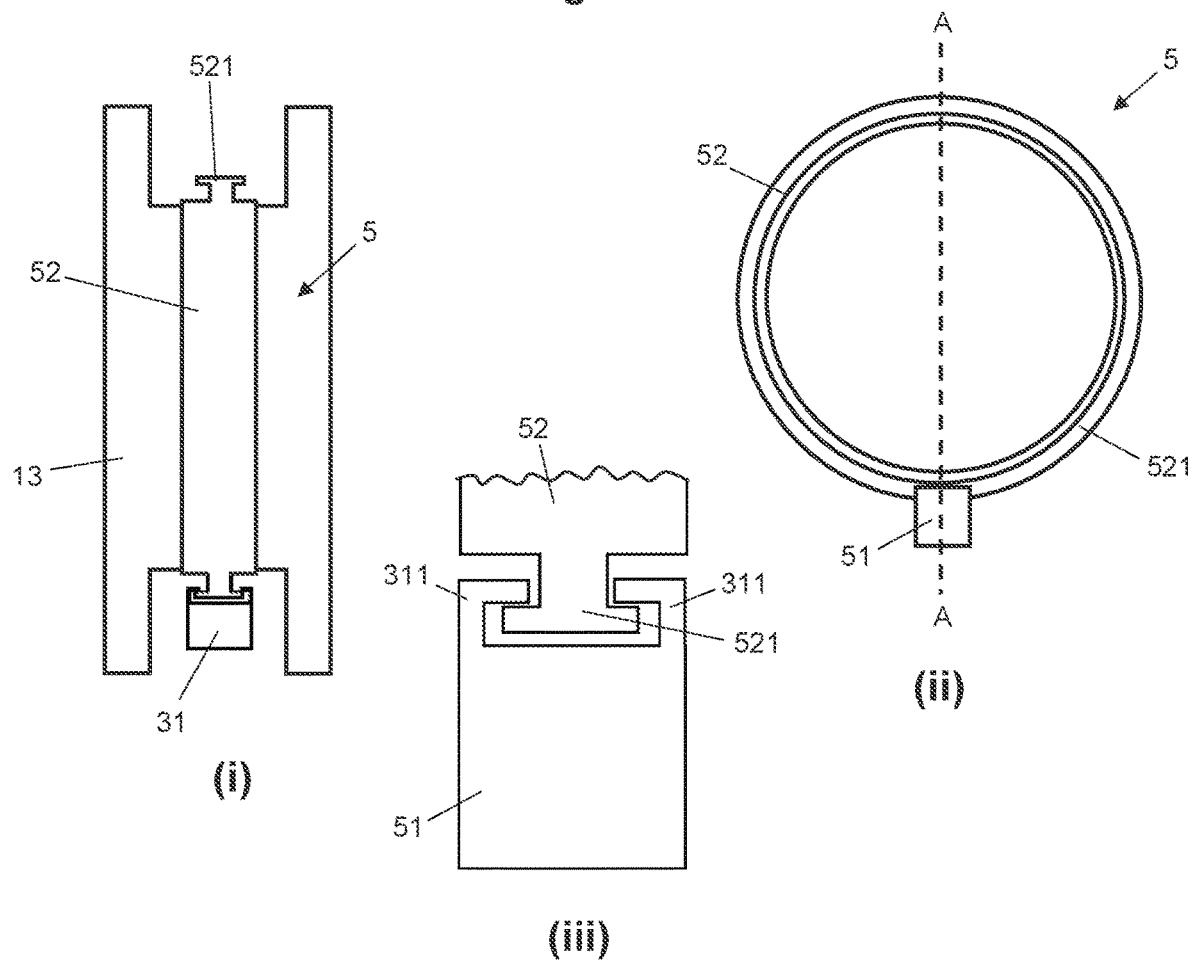
FIG. 5 is a set of schematic views of a further example sensor apparatus according to the invention, in isolation and installed on a wheel.

Various arrangements of the mounting member 12 and sensor 11 are possible within the scope of the invention. FIGS. 3-5 illustrate four such possible arrangements. In some examples the mounting member comprises a movable mounting band configured to be movably attached to a circumferential surface of the wheel such that relative circumferential movement between the movable mounting band and the wheel is permitted. In such examples the sensor is fixedly attached to the movable mounting band. In other examples the mounting member comprises a fixed mounting band configured to be fixedly attached to a circumferential surface of the wheel. In such examples the sensor is movably attached to the fixed mounting band such that the sensor is able to move around the circumference of the fixed mounting band.

Figure 2:
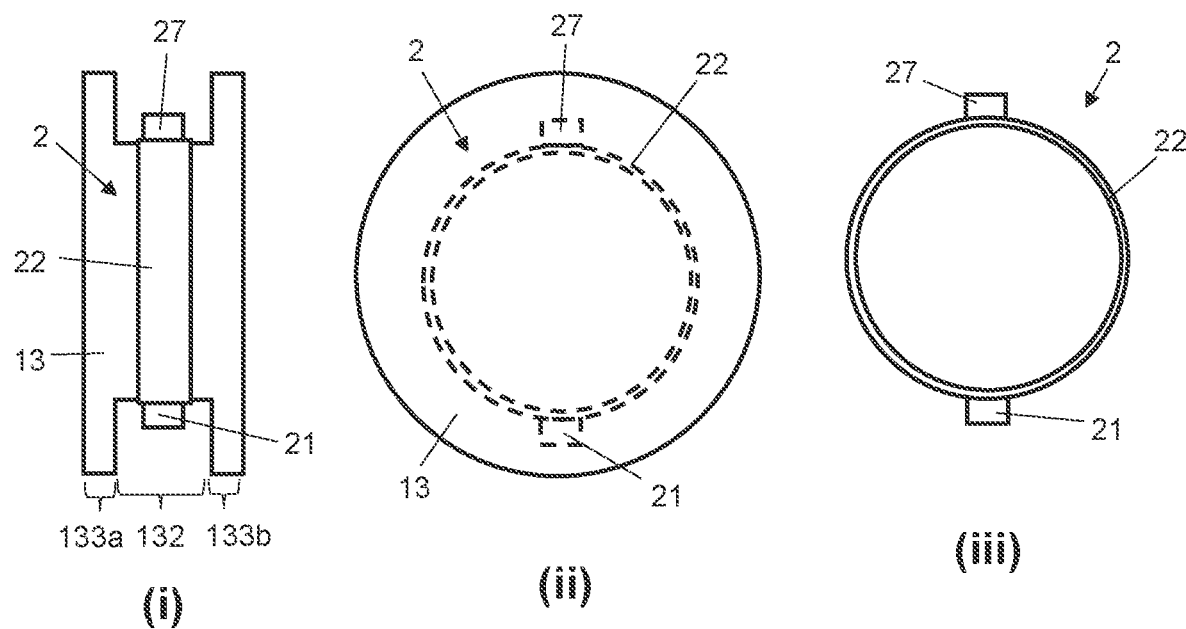
FIG. 2 is a set of schematic views of a further example sensor apparatus according to the invention, in isolation and installed on a wheel.

FIG. 2 shows an example sensor apparatus 2. Part (iii) is a side view of the sensor apparatus 2 in isolation, and parts (i) and (ii) are front and side views respectively of the sensor apparatus 2 mounted on the wheel 13. The sensor apparatus 2 comprises a mounting member 22, to which a sensor 21 and a further component 27 are attached. The sensor 21 is substantially the same as the example sensor 11 of FIG. 1.

The mounting member 22 comprises a movable mounting band configured to be movably attached to a circumferential surface of the wheel 13. In the illustrated example the wheel 13 comprises a hub part 132 between two flange parts 133a and 133b, and the movable mounting band 22 is configured to be attached to a circumferential surface of the hub part 132 of the wheel 13. The movable mounting band 22 is configured such that relative circumferential movement between the movable mounting band 22 and the wheel 13 is permitted when the movable mounting band 22 is attached to the wheel 13.

The movable mounting band 22 is a closed loop configured to encircle the circumferential surface of the hub part 132 of the wheel 13. The diameter of the movable mounting band 22 is substantially equal to the diameter of the circumferential surface of the wheel 13. An inner circumferential surface of the movable mounting band 22 contacts the circumferential surface of the wheel 13. The inner circumferential surface of the movable mounting band 22 and the circumferential surface of the wheel 13 are mutually configured to facilitate sliding therebetween. For example, the inner circumferential surface of the movable mounting band 22 and the circumferential surface of the wheel 13 may be mutually configured to ensure a low coefficient of friction therebetween. In some examples one or both of the inner circumferential surface of the movable mounting band 22 and the circumferential surface of the wheel 13 comprises a low-friction coating.

The movable mounting band 22 may be either rigid or flexible and may be formed from any material appropriate to the particular application. For example, if the sensor apparatus 2 is configured for use on an aircraft wheel assembly, the movable mounting band 22 should be lightweight and able to withstand high temperatures. The movable mounting band 22 may comprise a continuous piece of material, or it may have a join. It may be advantageous, for example, for the movable mounting band to be formed as a strip, the short edges of which become joined together during installation of the sensor apparatus on the wheel assembly. Any such joining mechanism must be sufficiently robust and reliable to remain joined for at least a desired period (which may, for example, be equal to a battery life of a battery of the sensor 21, or a life of the tire 14).

The sensor 21 and the further component 27 are each fixedly attached to the movable mounting band 22. Substantially no relative movement (in any direction) is permitted between the sensor 21 and further component 27 and the movable mounting band 22. The sensor 21 is fixedly attached to the movable mounting band 22 at a first circumferential location, and the further component 27 is fixedly attached to the movable mounting band 22 at a second, different circumferential location. In the illustrated example the second circumferential location is diametrically opposite the first circumferential location, which may be advantageous to balance the wheel 13. However; in other examples the second circumferential location need not be diametrically opposite the first circumferential location. Any suitable attachment mechanism appropriate to the intended application of the sensor apparatus 2 may be used to attach the sensor 21 and further component 27 to the movable mounting band 22. The attachment mechanism should be sufficiently robust and reliable to function for at least a desired period (which may, for example, be equal to a battery life of a battery of the sensor 21). The attachment mechanism may comprise, for example, a bonding agent, a mechanical interlock and/or one or more fasteners.

The further component 27 may be any of: a damper; a battery; an energy harvesting device; a communications device; a counterweight; a further sensor. In some examples the further component 27 comprises a package containing multiple types of device, such as a battery and a further sensor. In some examples the further component 27 is connected to the sensor 21 such that power and or communications signals can be sent from the further component 27 to the sensor 21, and/or vice versa. This may be achieved, for example, by providing a metallic wire or strip in or on the mounting band 22 which is connected to both the sensor 21 and the further component 27. It may be advantageous for the further component 27 to comprise a further sensor of the same type of the sensor 21, to provide redundancy in case of the failure of the sensor 21.

A movable mounting band of the type shown in FIG. 2 may be used for a sensor apparatus in which the further component 27 is not present (such as the sensor apparatus 1 of FIG. 1). Alternatively, a movable mounting band of the type shown in FIG. 2 may be used for a sensor apparatus in which multiple further components 27 are present. In such examples the components (including the sensor) may (but need not) be distributed evenly around the circumference of the movable mounting band.

The sensor apparatus 2 is configured to be installed on the wheel 13 before the tire 14 is fitted to the wheel 13. The manner in which the example sensor apparatus 2 is installable on the wheel 13 depends on the configuration of the mounting band 22. In examples in which the mounting band 22 comprises a strip with connected ends, the sensor apparatus 2 may be installed by arranging the strip on the circumferential surface of the hub part of the wheel 13 and then connecting the ends of the strip. In examples in which the mounting band 22 is formed as a continuous loop of material, the wheel 13 must be in a disassembled state (that is, an inboard part and an outboard part of the wheel 13 are not joined together) at the time of installing the sensor apparatus 2 on the wheel 13. The hub part of either the inboard or the outboard part of the wheel 13 is inserted into the mounting band 22 such that the mounting band encircles the hub part, and then the inboard and outboard parts of the wheel 13 are connected together. The installation may be performed manually by an operator, either during assembly of the wheel assembly 10 or during a maintenance process performed on the wheel assembly 10 (such as replacement of the tire 14).

FIG. 3 shows a further example sensor apparatus 3. Part (iii) is a side view of the sensor apparatus 3 in isolation, and parts (i) and (ii) are front and side views respectively of the sensor apparatus 3 mounted on the wheel 13. The sensor apparatus 3 comprises a mounting member 32, to which a sensor 31 is attached. The sensor 31 is substantially the same as the example sensor 11 of FIG. 1.

As with the FIG. 2 example, the mounting member 32 comprises a movable mounting band configured to be movably attached to a circumferential surface of the hub part 132 of the wheel 13 such that relative circumferential movement between the movable mounting band 32 and the wheel 13 is permitted when the movable mounting band 32 is attached to the wheel 13.

In this example the movable mounting band 32 is not a closed loop. Instead, the movable mounting band 32 comprises a C-shaped member. The C-shaped member is an inwardly-tensioned spring member. The C-shaped spring member 32 is configured (e.g. due to the selection of the material and dimensions of the C-shaped member) to have a particular tension. The tension of the C-shaped spring member 32 is high enough to retain the sensor apparatus 3 on the wheel 13 during normal operation of the wheel 13, but low enough to permit the relative circumferential movement of the sensor apparatus 3 and the wheel 13. The C-shaped spring member may be formed from any material appropriate to the particular application and for achieving the desired tension. For example, if the sensor apparatus 3 is configured for use on an aircraft wheel assembly, the C-shaped spring member 32 should be lightweight and able to withstand very high temperatures without losing tension.

An inner circumferential surface of the C-shaped spring member 32 contacts the circumferential surface of the wheel 13. The inner circumferential surface of the C-shaped spring member 32 and the circumferential surface of the wheel 13 are mutually configured to facilitate sliding therebetween. For example, the inner circumferential surface of the C-shaped spring member 32 and the circumferential surface of the wheel 13 may be mutually configured to ensure a low coefficient of friction therebetween. In some examples one or both of the inner circumferential surface of the C-shaped spring member 32 and the circumferential surface of the wheel 13 comprises a low-friction coating.

The sensor 31 is fixedly attached to the C-shaped spring member 32 at a selected location, in substantially the same manner as the sensor 21 of FIG. 2 is attached to the movable mounting band 22. Substantially no relative movement (in any direction) is permitted between the sensor 31 and the C-shaped spring member 32.

Although the illustrated sensor apparatus 3 does not comprise any further components additional to the sensor 31, this need not be the case in all examples having this type of movable mounting band. Any number of further components may be fixedly attached to the C-shaped spring member 32, in substantially the same manner as the further component 27 is attached to the movable mounting band 22 of the FIG. 2 example. Such further component(s) may have any of the features of the further component 27 described above.

The sensor apparatus 3 may be installed on the wheel 13 when the wheel 13 is in a disassembled state, in substantially the same manner as the example sensor apparatus 2. However; since the mounting band 32 of the sensor apparatus 3 is not a closed loop, the sensor apparatus 3 may alternatively be installed on the wheel 13 in an assembled state of the wheel 13, provided that the material forming the mounting band 23 is flexible and resilient enough that the gap between the ends of the C-shaped spring member can be enlarged to at least the diameter of the hub part of the wheel 13. In such examples the sensor apparatus 3 may be installed by an operator pulling apart the ends of the C-shaped spring member and then inserting the hub part of the wheel 13 between the ends. When the ends are released the resilience of the C-shaped spring member will cause it to resume its original shape, such that it is retained on the wheel 13.

FIG. 4 is a side view of a further example sensor apparatus 4. The sensor apparatus 4 is a modified version of the example sensor apparatus 3 of FIG. 3. The sensor apparatus 4 is substantially identical to the sensor apparatus 3 of FIG. 3, except that it additionally comprises five spacer elements 48 fixedly attached to the C-shaped spring member 32 at circumferentially distributed locations. Each spacer element comprises a contact surface 48 configured to contact a circumferential surface of a wheel on which the sensor apparatus 4 is mounted. The spacer elements are configured to prevent the C-shaped spring member 32 from directly contacting the circumferential surface of the wheel. The contact surface of each spacer element 48 may comprise a low-friction material to facilitate sliding between the spacer elements 48 and the circumferential surface of the wheel.

The spacer elements 48 may be formed from any suitable material appropriate for the intended application of the sensor apparatus 4. The spacer elements 48 may be rigid or resilient. The spacer elements 48 may be attached to the C-shaped spring member by any suitable mechanism, including any of the mechanisms mentioned above for attaching the sensor 31 to the C-shaped spring member. In some examples each spacer element 48 may be formed around the C-shaped spring member.

In some examples the spacer elements 48 may be movably attached to the C-shaped spring member 32. For example, each spacer element 48 may comprise a roller which is rotatably attached to the C-shaped spring member 32 by any suitable mechanism. Such rollers would be configured to rotate around axes that are parallel to the axis of a wheel on which the sensor apparatus 4 is mounted. The rollers would facilitate relative circumferential movement between the sensor apparatus 4 and the wheel. In some examples each roller could comprise a resilient material, to provide a damping effect.

An advantageous effect of the spacer elements 48 is that the contact area between the sensor apparatus 4 and the circumferential surface of the wheel is significantly reduced compared to the arrangement shown in FIG. 3 where no spacer elements 48 are present. A relatively small contact area reduces friction between the mounting band and the circumferential surface of the wheel, and so facilitates relative circumferential movement of the sensor apparatus 4 and the wheel. In the illustrated example each spacer element 48 has the form of a sphere, which minimizes the contact area as far as possible. However; any other three-dimensional shape could alternatively be used. Furthermore, it is not necessary for all of the contact elements 48 to have the same shape and/or size.

The number of spacer elements 48 may differ from what is shown in FIG. 4, as may the distribution of the spacer elements 48 around the circumference of the C-shaped spring member 32. It may be advantageous to provide a spacer element on each end of the C-shaped member, to provide easily graspable features for an installer to hold during a process of mounting the sensor apparatus 4 on the wheel. To enhance this effect, the spacer elements 48 disposed on the ends of the C-shaped spring member 32 may be larger and/or different shaped to others of the spacer elements 48. One or more of the spacer elements 48 may be configured to function as a counterweight, to facilitate balancing a wheel on which the sensor apparatus 4 is mounted. In such examples, the one or more spacer elements 48 configured to function as a counterweight may have a greater mass than any of the other spacer elements 48.

In some examples, the sensor 31 may be encapsulated within one of the spacer elements 48. In some examples the sensor apparatus 4 comprises one or more further components, any or all of which may be encapsulated within one or more spacer elements 48.

FIG. 5 shows a further example sensor apparatus 5. Part (ii) is a side view of the sensor apparatus 5 in isolation, and part (i) is a cross-section of the sensor apparatus 5, taken along the line A-A, mounted on the wheel 13. The sensor apparatus 5 comprises a mounting member 52, to which a sensor 51 is attached. The sensor 51 is substantially the same as the example sensor 11 of FIG. 1. In contrast to the example sensor apparatus of FIGS. 2-4, the mounting member 52 comprises a fixed mounting band configured to be fixedly attached to a circumferential surface of a wheel, and the sensor 51 is movably attached to the fixed mounting band 52 such that the sensor 51 is able to move around the circumference of the fixed mounting band 52.

The fixed mounting band 52 is a closed loop configured to encircle the circumferential surface of the hub part 132 of the wheel 13. The diameter of the fixed mounting band 52 is substantially equal to the diameter of the circumferential surface of the hub part of the wheel 13, at least when the fixed mounting band 52 is mounted on the wheel 13. The diameter of the fixed mounting band 52 may be adjustable, to facilitate installing it onto the wheel 13. An inner circumferential surface of the fixed mounting band 52 contacts the circumferential surface of the wheel 13. In some examples relative circumferential movement between the fixed mounting band 52 and the circumferential surface of the wheel 13 is prevented by mutually configuring the inner circumferential surface of the fixed mounting band 52 and the circumferential surface of the wheel 13 to ensure a high coefficient of friction therebetween. In some such examples one or both of the inner circumferential surface of the fixed mounting band 52 and the circumferential surface of the wheel 13 comprises a high-friction coating. In some examples the fixed mounting band 52 is configured to be tensioned when it is on the wheel 13. Alternatively or additionally, the fixed mounting band 52 may be configured to be fixed to the wheel 13 by an attachment mechanism such as a bonding agent, a mechanical interlock, and/or one or more fasteners. Any such attachment mechanism is selected to be suitable for an intended application of the sensor apparatus 5.

The fixed mounting band 52 is substantially rigid and may be formed from any material appropriate to the particular application. The fixed mounting band 52 may comprise a continuous piece of material, or it may have a join. If the fixed mounting band 52 comprises a join, any joining mechanism used to form the join must be sufficiently robust and reliable to remain joined for at least a desired period (which may, for example, be equal to a battery life of a battery of the sensor 51).

The sensor 51 may be attached to the fixed mounting band 52 in any manner which enables the sensor 51 to travel circumferentially around the fixed mounting band 52 when the sensor apparatus 5 is mounted on the wheel 13, whilst preventing relative radial and axial movement of the sensor 51 and fixed mounting band 52. In the illustrated example, the fixed mounting band 52 comprises a circumferential rail 521 which extends completely around the circumference of the fixed mounting band 52. The sensor 51 is movably mounted on the circumferential rail 521. The illustrated rail 521 has a T-shaped profile, although any other profile shape suitable for preventing radial and axial movement of the sensor 51 relative to the fixed mounting band 52 could be used. In some examples the fixed mounting band 52 may comprise two or more circumferential rails. The rail 521 may be formed integrally with the main body of the fixed mounting band 52, or it may be fixedly attached to the main body of the fixed mounting band 52.

The sensor 51 comprises a housing which is configured to engage with the circumferential rail 521. Part (iii) of FIG. 5 shows an enlarged cross-section through the sensor 51 and the circumferential rail 521. The configuration of the housing is dependent on the configuration of the circumferential rail 521, because the housing is configured to mechanically interlock with the circumferential rail 521. In the illustrated example, the housing of the sensor 51 comprises a pair of L-shaped protrusions 311 extending from a radially-inner surface of the housing. The spacing of the L-shaped protrusions is selected such that the head of the T-shaped circumferential rail 521 is able to be received between the protrusions with little or no axial and radial clearance between the head of the circumferential rail 521 and the protrusions. The L-shaped protrusions 311 extend circumferentially by an amount sufficient to substantially prevent pivoting of the sensor 51 relative to the fixed mounting band 52. In other examples the illustrated configuration could be reversed—that is, the fixed mounting band comprises a pair of L-shaped circumferential rails and the housing comprises a T-shaped protrusion configured to be received between the L-shaped circumferential rails. The surfaces of the sensor housing and the circumferential rail 521 which are in contact comprise bearing surfaces. These bearing surfaces may be configured to facilitate sliding therebetween, for example by comprising a low-friction material.

The mounting band 52 of sensor apparatus 5 is configured to be installed on the wheel 13 in a disassembled state of the wheel 13, in substantially the same manner described above for the example sensor apparatus 2. The sensor 51 may be attached to the mounting band 52 at the time of installing the mounting band 52 on the wheel 13, or it may be attached to the mounting band 52 after the mounting band 52 has been installed on the wheel 13. In some examples the mounting band 52 is tensioned after it has been arranged on the circumferential surface of the hub part of the wheel 13.

Figure 6:
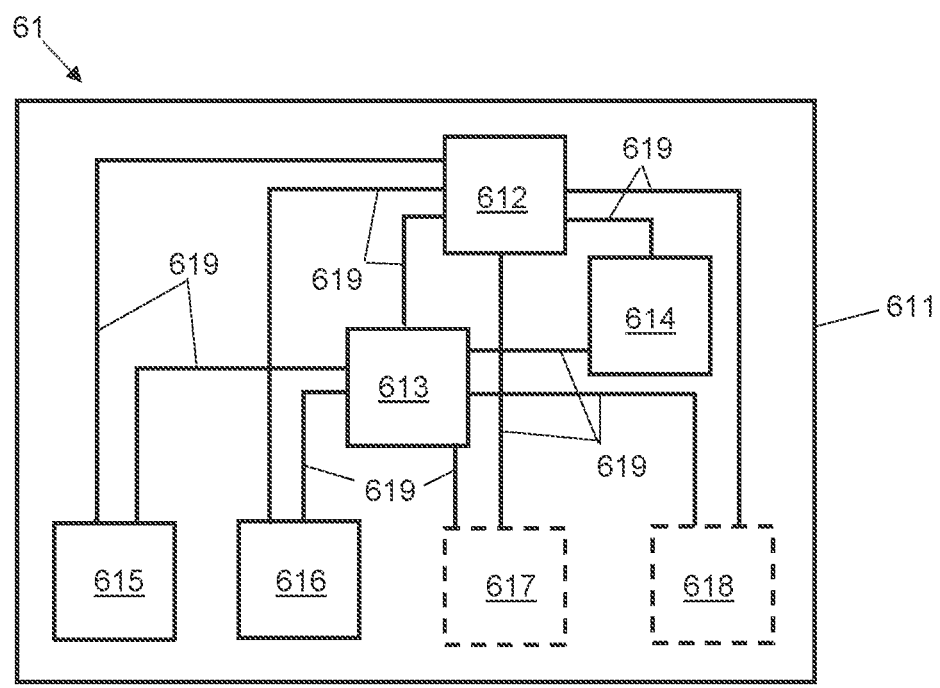
FIG. 6 is a schematic diagram of an example sensor package for a sensor apparatus according to the invention.

FIG. 6 is a schematic illustration of an example sensor 61 suitable for use with any example sensor apparatus according to the invention. The sensor 61 is in the form of a sensor package comprising various functional components. In the illustrated example these components comprise first and second sensor components 615, 616; a wireless communications interface 614; a power source 613; and a sensor controller 612. Optionally, the sensor package may further comprise a fourth sensor component 617 and/or a fifth sensor component 618. The components of the sensor package 61 are contained within a housing 611. Wired connections 619 are present between various of the components 612-618. In particular, each of the components 612, 614, 615, 616, 617 and 618 has a wired connection 619 to the power source 613, via which that component receives electrical power. Each of the components 613-618 has a wired connection to the sensor controller 612 via which that component can receive and/or transmit data. Such data may comprise, for example, control signals, measurement data, operational status data, or the like.

The components 612-618 and wired connections 619 are all contained within the housing 611. The housing 611 is configured to protect the components 612-618 and connections 619 from the external environment, including from any impacts and vibrations that may be experienced during operation of a sensor apparatus in which the sensor package 6 is to be comprised. The material(s) and configuration of the housing 611 are selected to be suitable for the particular intended application of a sensor apparatus in which the sensor package 6 is to be comprised. For example, if the sensor package 6 is intended for use on an aircraft wheel assembly, the housing must be able to withstand the extremes of temperature that can be experienced in an aircraft tire (potentially between −55° C. and 275° C.). In some examples the housing 611 may comprise a thick layer of silicone rubber. The housing 611 may further comprise features configured to facilitate attachment of the sensor package 6 to a mounting band (such as the L-shaped protrusions discussed above in relation to FIG. 5).

The first sensor component 615 comprises a distance sensor configured to emit radiation in direction toward the tire of a wheel assembly on which the sensor package 6 is mounted, and to detect a reflection of the emitted radiation. In some examples the distance sensor is configured to emit radiation in a radial direction of the wheel assembly, and/or at an acute angle to a radial direction of the wheel assembly. The radiation may be in the form of electromagnetic waves, such as visible or infrared light. The radiation may be in the form of sound waves, such as ultrasound. In some examples (particularly examples in which the object to which distance is being measured comprises a metallic element) the distance sensor is configured to use the Hall effect. The distance sensor may comprise any suitable sensor technology. The first sensor component 615 is configured to receive power from the power source 613. The first sensor component 615 is configured to receive control signals from the sensor controller 612. Such control signals may be configured to, for example, trigger the first sensor component 615 to perform a distance measurement. The first sensor component 615 is configured to send measurement data to the sensor controller 612.

Figure 7:
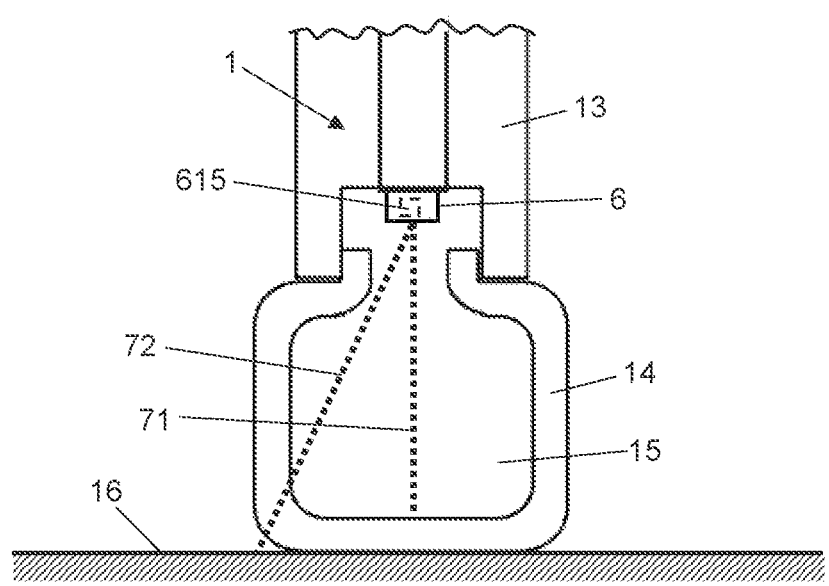
FIG. 7 is a schematic diagram of an example sensor apparatus comprising the sensor package of FIG. 6, in operation on a wheel assembly.

FIG. 7 illustrates the operating principle of the distance sensor 615. FIG. 7 shows the sensor package 6 comprised in the example sensor apparatus 1 and mounted on the wheel 13 in the manner described above in relation to FIG. 1. The sensor package 6 is positioned at the lowest point on the circumferential surface of the wheel 13. This is the position at which the sensor package 6 will be located when the wheel 13 is stationary or is rotating relatively slowly.

The distance sensor 615 is configured to emit a first beam 71 of radiation in a first direction, which is toward the inner circumferential surface of the tire 14. The first direction is a radial direction of the wheel 13. The first beam 71 is configured such that at least part of it will be reflected from the inner circumferential surface of the tire 14. This means that the first beam 71 can be used to measure the distance between the distance sensor 615 and the inner circumferential surface of the tire 14. The first beam may have a relatively narrow width, so that it is incident on a small area of the inner circumferential surface of the tire 14, or a relatively wider width, so that it is incident on a larger area of the inner circumferential surface. When there is no relative movement between the sensor package 6 and the wheel 13, the region of the inner circumferential surface of the tire 14 on which the first beam 71 is incident does not change, so the distance sensor 615 can only acquire measurements for this particular region. However; when there is relative rotation between the sensor package and the wheel 13, a complete circumferential section of the inner surface of the tire will pass through the area where the first beam 71 is incident. This enables the distance sensor 615 to scan the whole circumference of the tire inner surface.

Optionally, the distance sensor 615 is also configured to emit a second beam 72 of radiation in a second direction, which is at an acute angle to the first direction. In the illustrated example, the second direction is toward a side wall of the tire 14. However; the second beam 72 is configured to be mainly reflected by the surface 16 on which the tire 14 is supported, rather than by the inner surface of the tire 14. This means that the second beam 72 can be used to measure the distance between the distance sensor 615 and the surface 16. It will be appreciated that the measured distance to the surface 16 is not the shortest distance between the sensor 615 and the surface 16 due to the angle at which the second beam 72 is emitted. However; the shortest distance between the sensor 615 and the surface 16 can be calculated (e.g. by the sensor controller 612) from the measured distance based on the known angle of the second beam 72.

The second beam 72 may differ from the first beam 71 in terms of, for example, energy, wavelength, frequency, or any other property. The angle of the second beam 72 is such that it does not have to pass through the circumferential wall of the tire 14. This may be advantageous as some tires have reinforcing structures in this area which could block the second beam 72 and prevent it from reaching the surface 16. As with the first beam, the second beam 72 can be used either to take measurements at a particular rotational position of the wheel assembly (when there is no relative movement between the sensor package 6 and the wheel 13) or to take measurements covering multiple (or all) rotational positions of the wheel assembly (when there is relative movement between the sensor package 6 and the wheel 13).

The distance sensor 615 is thus configured to obtain two different types of measurement data: a distance between the sensor 715 and the inner wall of the tire 14, and a distance between the sensor 615 and the surface 16. Various physical properties of the wheel assembly, and even of a vehicle in which the wheel assembly is comprised, can be determined by operating the distance sensor according to various predefined measurement protocols, some of which require relative movement between the distance sensor 615 and the wheel 13 and others which do not. The sensor controller 612 is pre-programmed with such predefined measurement protocols and is configured to operate the distance sensor according to a currently selected measurement protocol, by sending control signals to the distance sensor 615.

The distance sensor 615 is be configured to perform a distance measurement using the first beam 71, and/or (in some examples) the second beam 72 in response to receiving a control signal from the sensor controller 612. The distance sensor 615 may be configured to apply a time-stamp indicating the time at which the measurement was performed to each measured distance value. The distance sensor 615 is configured to send measurement data comprising at least one measured distance value to the sensor controller 612. The distance sensor 615 is configured to receive electrical power from the power source 613.

Returning to FIG. 6, the second sensor component 616 of the sensor package 6 comprises a movement detector. The movement detector 616 may be configured to detect absolute movement of the sensor package 6. In such examples the output of the movement detector 616 may be used (e.g. by a processor of the movement detector 616 or by the sensor controller 612) in conjunction with data from a wheel speed sensor to detect relative movement of the sensor package 6 and the wheel to which the sensor package 6 is attached. Alternatively the movement detector 616 may be configured to directly detect relative movement between the sensor package 6 and the wheel. The movement detector 616 may use any suitable technology to detect the absolute or relative movement. In some examples the movement detector 616 comprises an accelerometer. In such examples the movement detector may be configured to, alternatively or additionally, determine an orientation of the sensor package 6 relative to the ground. Such orientation information may be useful, for example, to check the direction of the radiation beam(s) emitted by the distance sensor 615.

In some examples in which the movement detector 616 comprises an accelerometer, the movement detector 616 may be configured to, alternatively or additionally, measure vibration. Vibration data measured by the movement detector 616 could be used, e.g. by the sensor controller 612, to detect any or all of: wheel bearing failure; an out-of-balance state of the wheel; runway surface condition. In some examples in which the movement detector 616 comprises an accelerometer, the movement detector 616 may be configured to, alternatively or additionally, measure a maximum acceleration experienced by the wheel assembly during a selected operational period (such as a flight cycle of an aircraft, or a phase thereof). Maximum acceleration data measured by the movement detector 616 could be used, e.g. by the sensor controller 612, to detect when a particular operational condition occurs, such as a hard landing of an aircraft.

The movement detector 616 may be configured to perform a measurement in response to receiving a control signal from the sensor controller 612, or may be configured to automatically perform measurements at periodic intervals, or may be configured to continuously perform measurements. Performing a measurement may comprise a simple determination that movement (either relative or absolute) is or is not occurring at the time of the measurement, and/or may comprise measuring a value of one or more parameters of any detected movement (such as speed, direction, and the like). The movement detector 616 may apply a time-stamp indicating the time at which the measurement was performed to each measured value. The movement detector 616 is configured to send measurement data to the sensor controller 612. The measurement data may comprise, for example, any or all of: an indication of whether or not relative movement is present; a rate of relative movement; a rate of absolute movement. The movement detector 616 is configured to receive electrical power from the power source 613.

The power source 613 may be any type of power source suitable for supplying electrical power to the other components 612 and 614-618 of the sensor package 6. The power source 613 may comprise a battery, such as a lithium battery. Such a battery should have sufficient capacity to power the normal operation of all of the other components of the sensor package 6 for at least a maximum service interval of a wheel assembly on which the sensor package 6 is installed (that is, a longest time period that may elapse between maintenance processes performed on the wheel assembly). A battery comprised in the power source 613 may have sufficient capacity to power all of the components of the sensor package 6 for a selected time period which depends on the intended application of the sensor package 6. In some examples the power source 613 may comprise an energy harvesting device of any suitable type. In some examples the power source 613 may comprise both a battery and an energy harvesting device, in which case the capacity (and therefore the size) of the battery may be able to be smaller than if no energy harvesting device were present.

The wireless communications interface 614 is configured to be operated by the sensor controller 612 to both transmit data to, and receive data from, one or more other devices remote from the sensor package 6. The wireless communications interface 614 includes at least one transceiver. More than one transceiver may be provided, each using different wireless technology and/or arranged to transmit and receive over different ranges. Any suitable form or forms of wireless communications technology may be used by the wireless communications interface 614. The wireless communications interface 614 is configured to receive electrical power from the power source 613. The wireless communications interface 614 is configured to receive control signals (including data to be transmitted by the wireless communications interface 614) from the sensor controller 612.

The optional third sensor component 617 comprises a temperature sensor. The temperature sensor 617 is configured to directly measure the temperature of gas inside the tire. The temperature sensor 617 may be any suitable sensor for measuring gas temperature within a tire, such as a thermocouple. The temperature sensor 617 may be configured to perform a measurement in response to receiving a control signal from the sensor controller 612, or may be configured to automatically perform measurements at periodic intervals, or may be configured to continuously perform measurements. The temperature sensor 617 may be configured to apply meta-data to each measured temperature value which indicates the time at which the measurement was performed, or to associate each measured value with a time in some other manner. The temperature sensor 617 is configured to send measurement data comprising one or more measured temperature values to the sensor controller 612. The temperature sensor 617 is configured to receive electrical power from the power source 613.

The optional fourth sensor component 618 comprises a pressure sensor. The pressure sensor 618 may be any suitable sensor for measuring gas pressure inside a tire, for example a capacitive sensor. The pressure sensor 618 may be configured to perform a measurement in response to receiving a control signal from the sensor controller 612, or may be configured to automatically perform measurements at periodic intervals, or may be configured to continuously perform measurements. The pressure sensor 618 may be configured to apply meta-data to each measured pressure value which indicates the time at which the measurement was performed, or to associate each measured value with a time in some other manner. The pressure sensor 618 is configured to send measurement data comprising one or more measured pressure values to the sensor controller 612. The pressure sensor 618 is configured to receive electrical power from the power source 613.

The sensor controller 612 is configured to operate the other components of the sensor package 6. The sensor controller 612 may be pre-programmed with various measurement protocols and may operate the other components of the sensor package 6 according to the pre-programmed protocols. The sensor controller 612 may be configured to select a particular measurement protocol to use in dependence on current operational conditions, and/or may be configured to receive control commands from a remote system which specify the use of a particular measurement protocol.

In some examples the sensor controller 612 is configured to determine whether or not there is relative movement between the sensor package 6 and the wheel at the current time, and to alter its operation in dependence on the result of the determination. For example, the sensor controller 612 may be configured to operate in a first mode if there is relative movement between the sensor and the wheel, and in a second, different mode if there is substantially no relative movement between the sensor and the wheel. One or more of the predefined measurement protocols for operating the distance sensor 615 may only be suitable for use when there is relative circumferential movement between the sensor package 6 and the wheel, in which case the sensor controller 612 may be configured to select such a measurement protocol only when it has determined (e.g. based on measurement data received from the movement detector 616) that relative movement is occurring at the current time. For some of the types of measurement data able to be acquired by the sensor package 6 (such as pressure and temperature) it is irrelevant whether there is relative movement between the sensor package 6 and the wheel.

The sensor controller 612 may be configured to receive data from one or more remote systems, such as an aircraft avionics system, via the wireless communications interface 614. Such data may relate to current operational conditions of a vehicle in which the wheel assembly is comprised. In some examples the sensor controller 612 may be configured to receive current wheel speed data from a remote system.

The sensor controller 612 may comprise a processor and a memory unit. The memory unit may be used to store computer program instructions for execution by the processor; and data, such as measurement data received from the sensor components 615-618. The measurement protocols discussed above are stored in the memory unit in the form of computer program instructions. The memory unit may include non-volatile rewritable storage, such as flash memory which can retain data without requiring applied power. Alternatively, volatile storage, which is kept powered by the power source 613, may be employed; or combinations of read-only and rewritable storage. The memory unit of the sensor controller 612 may be configured to store a history of measurement data received from one or more of the sensor components 615-618. The history may be stored for a predetermined amount of time, which may be at least as long as a maximum time between manual wheel assembly maintenance operations. The predetermined amount of time may therefore be determined based on the intended application of the sensor package 6. This can ensure that enough history is held to provide details since the last manual wheel assembly maintenance operation, so that the history can be transferred for use in trend analysis, along with the current measurement data. Longer periods of history may also be kept.

In some examples the sensor controller 612 is configured to operate the wireless communications interface 614 to send control signals to a remote indicating device, for example located at a position on the vehicle which is visible from the outside of the vehicle. Alternatively the remote indicating device may be a mobile device configured to be used by an operator to periodically interrogate the sensor controller 612. The remote indicating device may be configured to provide information about the condition of the wheel assembly to maintenance crews, and may use any suitable indicating technology to provide the indication.

In some examples the sensor controller 612 is configured to operate the wireless communications interface 614 to communicate data with other sensor apparatus mounted on other wheel assemblies of the same vehicle. In such examples, one sensor apparatus of the set of sensor apparatus installed on the vehicle may be configured to collate data from all of the sensor apparatus and to send a control signal based on the collated data to a single remote indicating device. For example, if any of the measurement data acquired by any of the sensor apparatus indicates that maintenance of a wheel assembly is required, the control signal may cause the indicating device to indicate that maintenance is required. Such an arrangement reduces the need for an operator to check each wheel assembly individually.

In some examples the sensor controller 612 may be configured to operate the wireless communications interface 614 to communicate data with a further system of a vehicle in which the wheel assembly is comprised. Where the vehicle is an aircraft, for example, such a further system may be a cockpit system for providing information to flight crew, or an avionics system.

Figure 8:
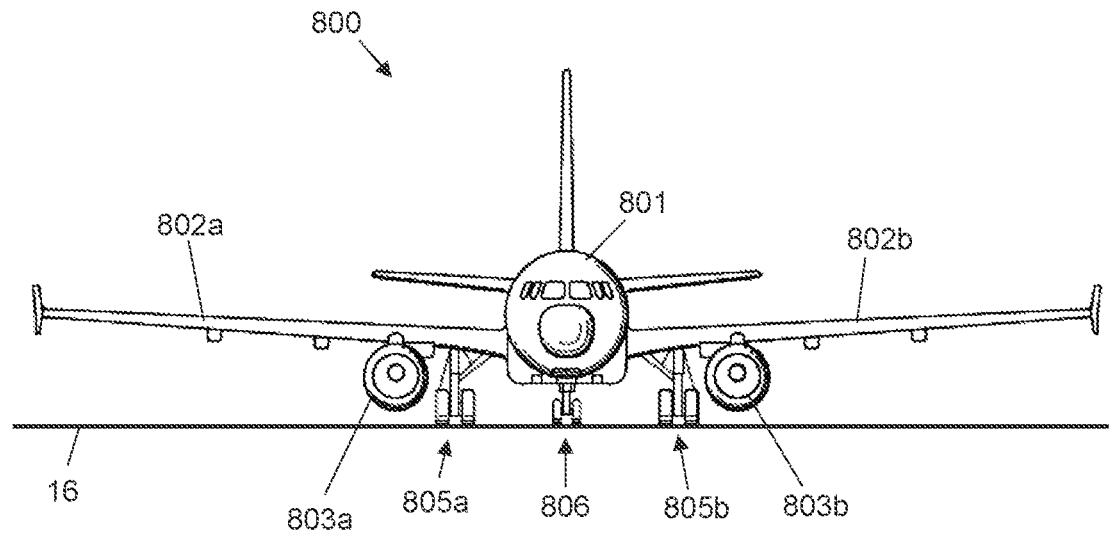
FIG. 8 is a front view of an example aircraft comprising a sensor apparatus according to the invention.

FIG. 8 is a front view of an example aircraft 800 which comprises at least one sensor apparatus according to the invention. The aircraft 800 comprises a pair of wings 802a, 802b and a fuselage 801. The wings 802a, 802b each carry an engine 803a, 803b respectively. The aircraft 800 is supported on the ground by a pair of main landing gear (MLG) 805a, 805b and a nose landing gear (NLG) 806. Each landing gear assembly 805a, 805b, 806 comprises a pair of wheel assemblies. Each wheel assembly of the aircraft 800 may have the same features as the example wheel assembly 1 of FIG. 1. The wheel assemblies of the aircraft 800 are shown in contact with the surface 16, which in this example is an airport surface such as a runway. This aircraft has six wheel assemblies in total; four wheel assemblies as part of the MLG 805a, 805b and two wheel assemblies as part of the NLG 806. The aircraft 800 may therefore comprise up to six sensor apparatus according to the invention (one per wheel assembly). It will generally be advantageous to provide a sensor apparatus on each wheel assembly of an aircraft or other vehicle. Other models of aircraft may have different numbers of wheel assemblies and hence different numbers of sensor apparatus.

Figure 9:
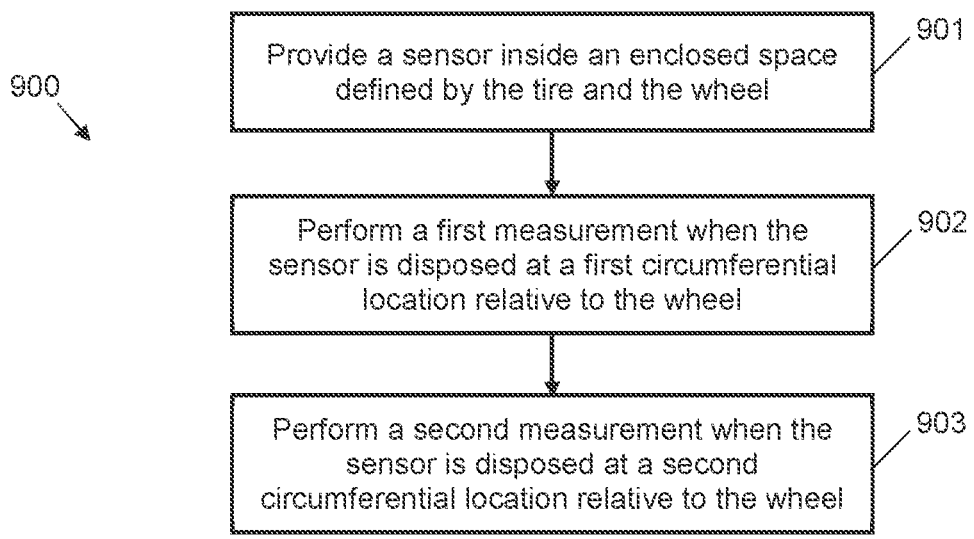
FIG. 9 is a flow chart illustrating an example method of measuring a property of a wheel assembly, according to the invention.

FIG. 9 is a flow chart illustrating an example method 900 of measuring a property of a wheel assembly comprising a tire mounted on a wheel. The method is configured to be performed using a sensor apparatus according to the invention, such as any of the example sensor apparatus 1-5 described above.

A first block 901 comprises providing a sensor inside an enclosed space defined by the tire and the wheel. The sensor may be comprised in a sensor apparatus according to the invention. Providing the sensor may comprise mounting the sensor on the wheel such that it is able to move around the circumference of wheel, in any of the manners described above with reference to FIGS. 1 to 5. Block 901 may be performed during manufacture of the wheel assembly, and/or during a maintenance of the wheel assembly. Block 901 may be performed, for example, during a process of installing a tire on the wheel. Block 901 may be performed manually by an operator.

A second block 902 comprises performing a first measurement when the sensor is disposed at a first circumferential location relative to the wheel. Performing the first measurement may comprise measuring a property of the wheel assembly. Performing the first measurement may comprise measuring a distance between the sensor and a part of the wheel assembly, in any of the manners described above in relation to the example distance sensor 615. The first circumferential location may be any location on the circumference of the wheel. Block 902 may be performed automatically by the sensor as a result of instructions pre-programmed onto the sensor. Block 902 may be performed in response to the sensor receiving a control signal configured to trigger performance of block 902 from a further system.

A third block 903 comprises performing a second measurement when the sensor is disposed at a second, different circumferential location relative to the wheel. The second measurement is of the same property of the wheel assembly as the first measurement and is performed in the same manner as the first measurement. The second circumferential location may be separated from the first circumferential location, or it may be adjacent to the first circumferential location. The sensor may be at substantially the same location relative to a vehicle in which the wheel assembly is comprised during the performance of the second measurement and during the performance of the first measurement.

Between performing block 902 and performing block 903 the wheel is rotated about its axis. The amount by which the wheel is rotated corresponds to the circumferential separation of the first and second circumferential locations. The wheel assembly (and therefore a vehicle in which the wheel assembly is comprised) may undergo translational movement between the performance of blocks 902 and 903. The amount of the translational movement may correspond to the amount by which the wheel is rotated between the performance of blocks 902 and 903. The rotation of the wheel may be as a result of the normal operation of the wheel assembly to support and/or drive movement of a vehicle in which the wheel assembly is comprised. The change in the relative circumferential position of the sensor and the wheel occurs because the sensor experiences substantially no rotational movement when the wheel rotates between the performance of blocks 902 and 903. This is because the sensor is free to move circumferentially around the wheel, and because the force of gravity acting on the sensor acts to resists movement of the sensor away from its lowest possible position (that is, the position closest to the ground). The rotation of the wheel which occurs between the performance of blocks 902 and 903 is at a sufficiently low rate that the centrifugal force on the sensor does not overcome the force of gravity on the sensor. The wheel may rotate continuously during performance of the method 900, at a sufficiently low rate that the centrifugal force on the sensor does not overcome the force of gravity on the sensor.

The method 900 may comprise performing a series of measurements, the series including the first measurement and the second measurement, wherein each measurement of the series is performed when the sensor is at a different circumferential location relative to the wheel. The different circumferential locations are distributed around the circumference of the wheel. In some examples the different circumferential locations may be substantially evenly distributed around the circumference of the wheel. In some examples the circumferential separation between each of the different circumferential locations is small enough that substantially all of the circumference of the wheel is covered by the series of measurements. The method 900 may be completed once measurements have been acquired which cover substantially all of the circumference of the wheel. The method 900 may comprise repeatedly performing the series of measurements for as long as the wheel is rotating at a sufficiently low speed. The method 900 may comprise repeatedly performing the series of measurements until the sensor receives a control signal configured to stop the sensor from performing measurements.

The method 900 involves performing measurements on different circumferential locations of the wheel, and is therefore especially suited to measuring properties of the wheel assembly which may vary around its circumference such as tread depth. However; sensor apparatus according to the invention may also be used to obtain one or more measurements relating to a single circumferential location. In such examples the one or more measurements are performed when there is no relative circumferential movement between the sensor and the wheel. Sensor apparatus according to the invention may also, in some examples, be used to perform one or more measurements which do not relate to circumferential location, such as tire pressure. In such examples the one or more measurements may be performed at any time, regardless of whether there is relative circumferential movement occurring between the sensor and the wheel at the time of performing the measurements.

Although the invention has been described above with reference to one or more preferred examples or embodiments, it will be appreciated that various changes or modifications may be made without departing from the scope of the invention as defined in the appended claims.

Although the invention has been described above mainly in the context of a fixed-wing aircraft application, it may also be advantageously applied to various other applications, including but not limited to applications on vehicles such as helicopters, drones, trains, automobiles and spacecraft.

Where the term "or" has been used in the preceding description, this term should be understood to mean "and/or", except where explicitly stated otherwise.

The invention claimed is:

1. A sensor apparatus for measuring a property of a wheel assembly comprising a tire mounted on a wheel, the sensor apparatus comprising:
  at least one sensor configured to acquire measurement data; and
  a mounting member attached to the at least one sensor, the mounting member being configured to engage with the wheel to retain the sensor on the wheel within an enclosed space formed by the wheel and the tire mounted on the wheel;
  wherein the mounting member is configured to enable the sensor to move around a circumference of the wheel when the mounting member is engaged with the wheel;
  wherein the sensor apparatus is configured to determine whether there is relative movement between the sensor and the wheel with which the mounting member is engaged, and
  wherein the sensor is configured to operate in a first mode if there is relative movement between the sensor and the wheel, and in a second, different mode if there is no relative movement between the sensor and the wheel.

2. The sensor apparatus according to claim 1, wherein the mounting member is configured to enable the sensor to continuously travel around the circumference of the wheel in a given direction whilst the wheel remains stationary, when the mounting member is engaged with the wheel.

3. The sensor apparatus according to claim 1, wherein the mounting member is configured to prevent radial and axial movement of the sensor relative to the wheel when the mounting member is engaged with the wheel.

4. The sensor apparatus according to claim 1, wherein the mounting member is configured such that when the mounting member is engaged with the wheel in a deployed operational orientation of the wheel in which the wheel has a lower part near to a surface on which the wheel assembly is resting and an upper part far from the surface, during rotation of the wheel at a taxiing speed the mounting member enables the sensor to be continuously disposed on the lower part of the wheel.

5. The sensor apparatus according to claim 4, wherein during the rotation of the wheel at the taxiing speed the mounting member enables the sensor to be continuously disposed at a lowest part of the wheel.

6. The sensor apparatus according to claim 1, wherein the mounting member comprises a movable mounting band configured to be movably attached to a circumferential surface of the wheel such that relative circumferential movement between the movable mounting band and the wheel is permitted, and wherein the sensor is fixedly attached to the movable mounting band.

7. The sensor apparatus according to claim 6, wherein the sensor is fixedly attached to the movable mounting band at a first circumferential location, and at least one further component is fixedly attached to the movable mounting band at a second, different circumferential location.

8. The sensor apparatus according to claim 7, wherein the at least one further component comprises any one or more of: a damper; a battery; a communications device; a counterweight.

9. The sensor apparatus according to claim 6, wherein the movable mounting band comprises one or more contact surfaces configured to contact the circumferential surface of the wheel, and wherein the or each contact surface comprises a low-friction material to facilitate sliding between the or each contact surface and the circumferential surface of the wheel.

10. The sensor apparatus according to claim 6, wherein the movable mounting band is a closed loop configured to encircle the circumferential surface of the wheel.

11. The sensor apparatus according to claim 6, wherein the movable mounting band is an inwardly-tensioned C-shaped spring member.

12. The sensor apparatus according to claim 1, wherein the mounting member comprises a fixed mounting band configured to be fixedly attached to a circumferential surface of the wheel, and wherein the sensor is movably attached to the fixed mounting band such that the sensor is able to move around the circumference of the fixed mounting band.

13. The sensor apparatus according to claim 12, wherein the fixed mounting band comprises at least one circumferential rail which extends completely around the circumference of the fixed mounting band, and wherein the sensor is movably mounted on the at least one circumferential rail.

14. The sensor apparatus according to claim 1, wherein the sensor is configured to emit radiation in a radial direction of the wheel with which the mounting member is engaged, and to detect a reflection of the emitted radiation.

15. A wheel assembly comprising:
the sensor apparatus according to claim 1 mounted on an outer circumferential surface of the wheel, wherein the outer circumferential surface of the wheel is configured to face an inner circumferential surface of the tire mounted on the wheel.

16. The wheel assembly according to claim 15, wherein the wheel assembly is an aircraft wheel assembly.

17. An aircraft comprising the assembly according to claim 16.

18. A method of measuring a property of a wheel assembly comprising a tire mounted on a wheel, the method comprising:
providing a sensor inside an enclosed space defined by the tire and the wheel;
wherein a mounting member is attached to the at least one sensor, the mounting member being configured to engage with the wheel to retain the sensor on the wheel within an enclosed space formed by the wheel and the tire mounted on the wheel;
wherein the mounting member is configured to enable the sensor to move around the circumference of the wheel when the mounting member is engaged with the wheel;
performing a first measurement when the sensor is disposed at a first circumferential location relative to the wheel;
performing a second measurement when the sensor is disposed at a second, different circumferential location relative to the wheel; and,
wherein the sensor is configured to determine whether there is relative movement between the sensor and the wheel with which the mounting member is engaged, and
wherein the sensor is configured to operate in a first mode if there is relative movement between the sensor and the wheel, and in a second, different mode if there is no relative movement between the sensor and the wheel.

19. The method according to claim 18, wherein the wheel is rotated about its axis between performing the first measurement and performing the second measurement.

20. The method according to claim 18, comprising performing a series of measurements, the series including the first measurement and the second measurement, wherein each measurement of the series is performed when the sensor is at a different circumferential location relative to the wheel, and wherein the different circumferential locations are distributed around the circumference of the wheel.

21. The method according to claim 18, wherein the wheel comprises an outer circumferential surface configured to face an inner circumferential surface of the tire mounted on the wheel, and a sensor apparatus comprising at least one sensor configured to acquire measurement data; and a mounting member attached to the at least one sensor, the mounting member being configured to engage with the wheel to retain the sensor on the wheel within an enclosed space formed by the wheel and the tire mounted on the wheel; wherein the mounting member is configured to enable the sensor to move around the circumference of the wheel when the mounting member is engaged with the wheel, and wherein the sensor apparatus is mounted on the outer circumferential surface of the wheel.

* * * * *